UNITED STATES PATENT OFFICE.

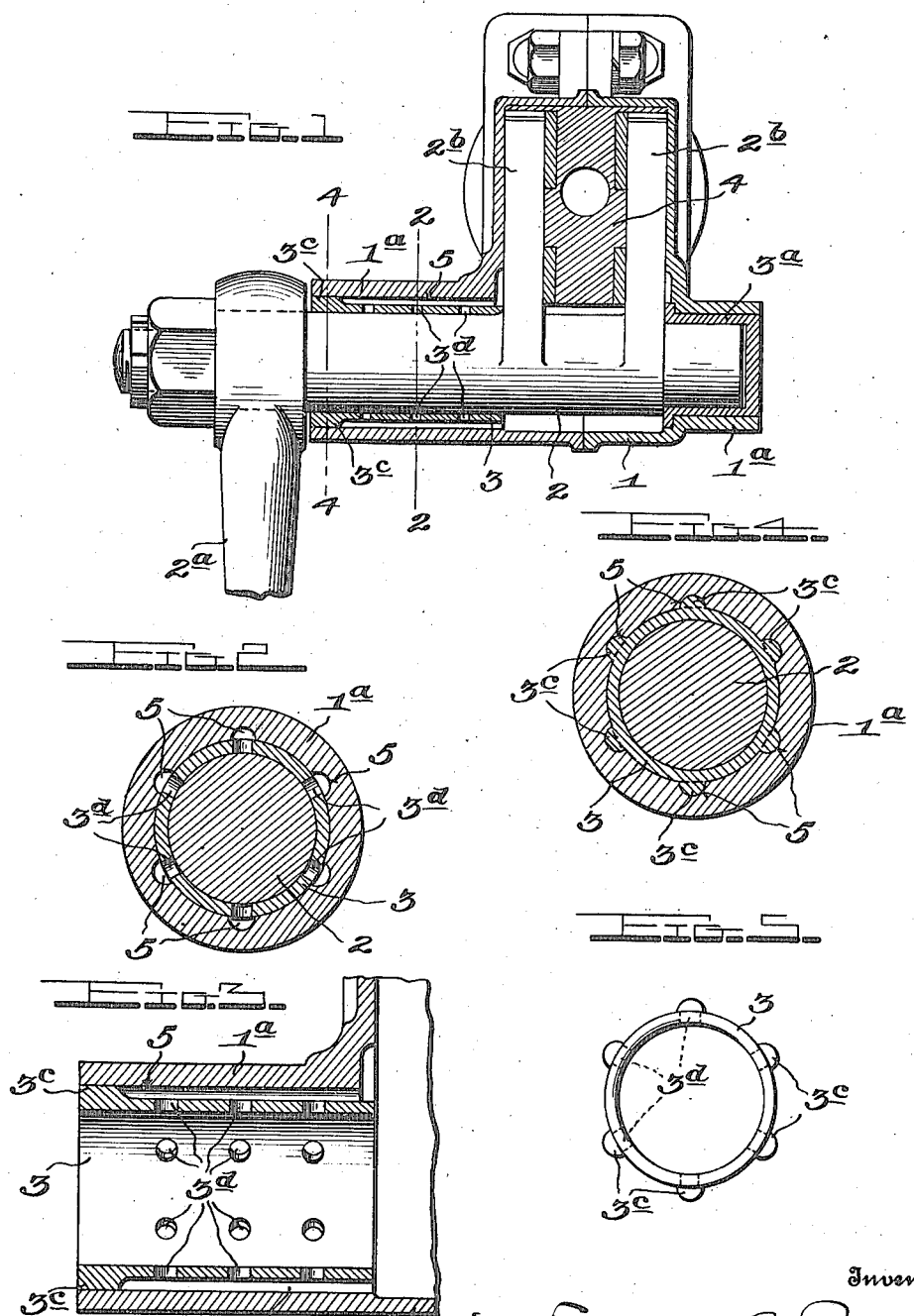

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING-GEAR-ROCKER-SHAFT-LUBRICATING MEANS.

1,233,127.     Specification of Letters Patent.     Patented July 10, 1917.

Application filed October 23, 1914. Serial No. 868,172.

*To all whom it may concern:*

Be it known that I, DAVID E. Ross, a citizen of the United States, residing at La Layette, in the county of Tippecanoe and State of Indiana, have invented certain new and useful Improvements in Steering-Gear-Rocker-Shaft-Lubricating Means; and I hereby declare that the following is a full, clear, and exact description thereof, reference being had to the accompanying drawings, which form part of this specification.

This invention is a novel means for supplying lubricant to shafts and the like, being especially designed for use in connection with automobile-steering gears for oiling the rocker-shafts thereof, through which shafts motion is transmitted from the steering head to the steering crank. The object of the invention is to insure thorough lubrication of the rocker-shaft in its bearing; to enable same to be oiled from the interior of the gear casing; and to do away with the necessity of employing any exterior oiling connections for, or attachments to, the rocker-shaft.

Considerable trouble with steering-gears is caused by the rocker-shaft galling and binding in its bearings for lack of lubrication. The ordinary steering gears have no provision for oiling such rocker-shafts except as the oil may exude from the inside of the casing into the shaft bearing. In some steering gears the rocker-shaft is drilled axially and a grease cup is attached to the outer end of such bore, and lateral holes are also drilled in the shaft so that the oil entering from the grease cup can pass from the central bore through the lateral holes to the bearing surfaces. Such construction has many disadvantages, the principal one being that the grease cup is located where it is not visible nor readily accessible and the operator usually forgets to fill it.

By my present invention the rocker-shaft is supplied with lubricant from the gear-casing in a novel manner, and by novel means, which will be hereinafter described; and I will explain the invention as applied to the rocker-shaft of a well known type of steering-gear, for which it is particularly designed; but the invention when once understood can be readily adapted to other forms of shaft bearings, and is not restricted to rocker-shafts.

I will explain the invention as embodied in the construction illustrated in the drawings; and the claims summarize the essential novel features and novel construction of parts for which protection is desired.

In said drawings—

Figure 1 is a sectional view of a steering gear having rocker-shaft oiling devices in accordance with my invention.

Fig. 2 is an enlarged detail transverse section on line 2—2, Fig. 1.

Fig. 3 is a detail longitudinal section of the bearing with the shaft removed.

Fig. 4 is a transverse section on line 4—4, Fig. 1.

Fig. 5 is an end view of the bushing detached.

1 designates the casing of a steering gear of any suitable construction, and is shown as provided with a lateral tubular extension $1^a$ forming a bearing for the rocker-shaft 2, which is journaled transversely of the casing and fitted in the bushings 3 and $3^a$ therein.

The rocker-shaft 2 is provided on its outer end with a crank $2^a$; and within the casing may be provided with crank fingers or members $2^b$ which may be engaged with a reciprocating member 4 that can be operated by usual means, not shown, transversely of shaft 2 so that the movement of this member 4 imparts a rocking motion to the shaft 2. The means however for imparting rocking motion to the shaft 2 forms no part of the present invention and may be of any desired construction.

As stated the shaft 2 ordinarily depends for lubrication either upon the possible leakage of oil from the casing 1 through the journal bearing of the shaft; or the shaft is bored and connected with an exterior oil supply.

In my invention the bore of the bearing $1^a$, in which the bushing 3 is fitted, is preferably longitudinally grooved, as indicated at 5, such grooves being preferably about 60 degrees apart around the circumference of the bushing 3. The bushing 3 may be cylindric for the greater portion of its length but near its outer end it is shown as provided with projections $3^c$, corresponding in cross section to the cross section of the grooves or slots 5 and extending a short distance, say one-fourth to one-half an inch, inward from the outer end of the bushing. The bushing 3 should have a close, or press, fit within the bore of the bearing 1ª and when completely inserted therein the projections 3ᶜ enter and close the outer ends of the grooves 5, see Fig. 4. The inner unobstructed portions of the grooves 5 communicate with the interior of the gear casing at the inner end of the bushing, (see Figs. 1 and 3) and form oil conduits or channels extending from the interior of the casing nearly to the outer end of the bushing.

The bushing 3 is perforated radially at as 3ᵈ at points in line with the projections 3ᶜ; and when the bushing is inserted in place the perforations 3ᵈ communicate with the unobstructed portions of the grooves 5 and thus oil can pass directly from the interior of the casing 1 through the grooves 5 and the perforations 3ᵈ onto the exterior surface of the shaft journal within the bushing, and thus thoroughly lubricate the shaft in its bearing.

Ordinarily the rocker-shaft, in the construction shown in the drawings, oscillates or rocks about 60 degrees, and the grooves 5 and perforations 3ᵈ should be made about 60 degrees apart, circumferentially of the shaft, so that the entire circumference of the shaft journal will be thoroughly lubricated within the bushing.

It will be noted that the parallel grooves in the housing are closed at their outer ends by the projections on the bushing, so that while the oil can freely pass through the grooves to the perforations in the bushing it does not escape from the grooves. With this construction the shaft is lubricated from the inside of the gear-casing instead of from the outside.

The number and arrangement of grooves in the bearing and perforations in the bushing can be varied, and the grooves could be formed in the bushing instead of in the housing, if desired.

As above stated while the invention is especially designed for use in connection with the rocker-shafts of steering-gears, it is readily adaptable to other shaft bearings. It is particularly useful in connection with steering gears as the casing 1 is ordinarily filled with oil supplied thereto through an opening in the steering shaft or casing where it is conveniently accessible; and it is not necessary with this invention to get under the machine to lubricate the rocker-shaft bearings, and the same will remain lubricated as long as oil is supplied to the interior of the casing.

What I claim is:

1. In combination, a housing having a bore provided with longitudinal grooves, a bushing fitted in said bore and closing the inner sides of said grooves, said bushing also having projections adapted to close one end of the grooves and provided with openings communicating with the slots, and an oil supply communicating with said grooves.

2. In combination, a tubular bearing having longitudinal grooves in its bore, a bushing fitted in said bearing and closing the inner sides of the grooves and having projections on one end closing the outer ends of the grooves, and said bushing also having perforations communicating with the grooves to permit flow of oil from the grooves into the bushing, and a shaft journaled in said bushing.

3. In combination with a steering-gear casing having a tubular bearing for a rocker-shaft, said bearing having longitudinal grooves in its bore communicating at their inner ends with the casing, a cylindrical bushing fitted in said bearing and closing the bores radially and having radial projections on one end engaging and closing the outer ends of the grooves; said bushing also having radial perforations communicating with the grooves to permit flow of oil from the grooves into the bushing, and a rocker-shaft journaled in said bushing.

4. In a rocker shaft bearing, the combination with a casing having a bearing extension, a shaft journaled therein, a sleeve bushing fitted in said bearing extension around said shaft, said bearing extension being provided with longitudinal oil supplying grooves through its inner surface communicating with the interior of the casing at their inner ends, and said bushing having radial oil apertures communicating with said grooves and supplying oil to the shaft, and plugs for closing the outer ends of the grooves, substantially as described.

In testimony that I claim the foregoing as my own, I affix my signature in presence of two witnesses.

DAVID E. ROSS.

Witnesses:
 EDWARD A. ROSS,
 GEO. C. KUMMING.